United States Patent
Woodruff

Patent Number: 6,152,235
Date of Patent: Nov. 28, 2000

[54] UNIVERSAL CLOVEN HOOF SHOE

[76] Inventor: Dale K. Woodruff, 6191 S. East, Fresno, Calif. 93706

[21] Appl. No.: 09/227,182

[22] Filed: Jan. 7, 1999

[51] Int. Cl.$^7$ ..................................................... A01L 9/00
[52] U.S. Cl. ................................................ 168/5; 168/18
[58] Field of Search ................................... 168/4, 14, 18, 168/17, 26, 5, 6; 54/82; 36/111, 59 C

[56] References Cited

U.S. PATENT DOCUMENTS

| | | | |
|---|---|---|---|
| 44,522 | 10/1864 | Forker | 168/20 |
| D. 68,214 | 9/1925 | McDonald | D30/147 |
| D. 78,502 | 5/1929 | Blair | D30/147 |
| 220,937 | 10/1879 | Meier | 168/18 |
| 267,855 | 11/1882 | Fenley, Sr. | 168/18 |
| D. 295,907 | 5/1988 | Decker | D30/147 |
| D. 359,597 | 6/1995 | Dixon | D30/147 |
| 481,790 | 8/1892 | Hoar | 54/82 |
| 1,294,896 | 2/1919 | Grant | 168/18 |
| 1,808,063 | 6/1931 | Paterson | 36/59 C |
| 4,174,754 | 11/1979 | Glass | 168/18 |
| 4,319,412 | 3/1982 | Muller et al. | 36/59 C |
| 4,346,762 | 8/1982 | Tovim | 168/4 |
| 4,444,269 | 4/1984 | Laurent | 168/18 |
| 4,470,466 | 9/1984 | Nakanishi | 168/18 |
| 4,564,071 | 1/1986 | Lee | 168/19 |
| 4,892,150 | 1/1990 | Thoman | 168/4 |
| 5,148,872 | 9/1992 | Dallmer | 168/11 |
| 5,224,549 | 7/1993 | Lightner | 168/18 |
| 5,875,853 | 3/1999 | Logan | 168/18 |

FOREIGN PATENT DOCUMENTS

| | | | |
|---|---|---|---|
| 374804 | 5/1923 | Germany | 168/5 |
| 2223152 | 4/1990 | United Kingdom | 168/18 |

*Primary Examiner*—Michael J. Carone
*Assistant Examiner*—Son T. Nguyen
*Attorney, Agent, or Firm*—Mark D. Miller

[57] ABSTRACT

A universal cloven hoof shoe is described including a sole section having a top surface, an opposed bottom side, a toe end and sides joining the top surface and bottom side and extending rearwardly from the toe end. An upper section is formed integrally with the sole section and extends upwardly from the sides and rearwardly from the toe end, terminating to leave an extension of the sole at the heel end. The sole section and upper section are formed of a flexible material, and the upper section is shaped such that it may receive either a medial or lateral claw of a cloven hoof. The present invention eliminates the need to provide one shoe configuration for a lateral (e.g. left) claw and another configuration for a medial (e.g. right) claw. Further, the upper section is angled with respect to the top surface of the sole section to conform to an angle of a hoof claw. A tread pattern is formed along the bottom edge of the sole section to provide support in critical areas.

11 Claims, 5 Drawing Sheets

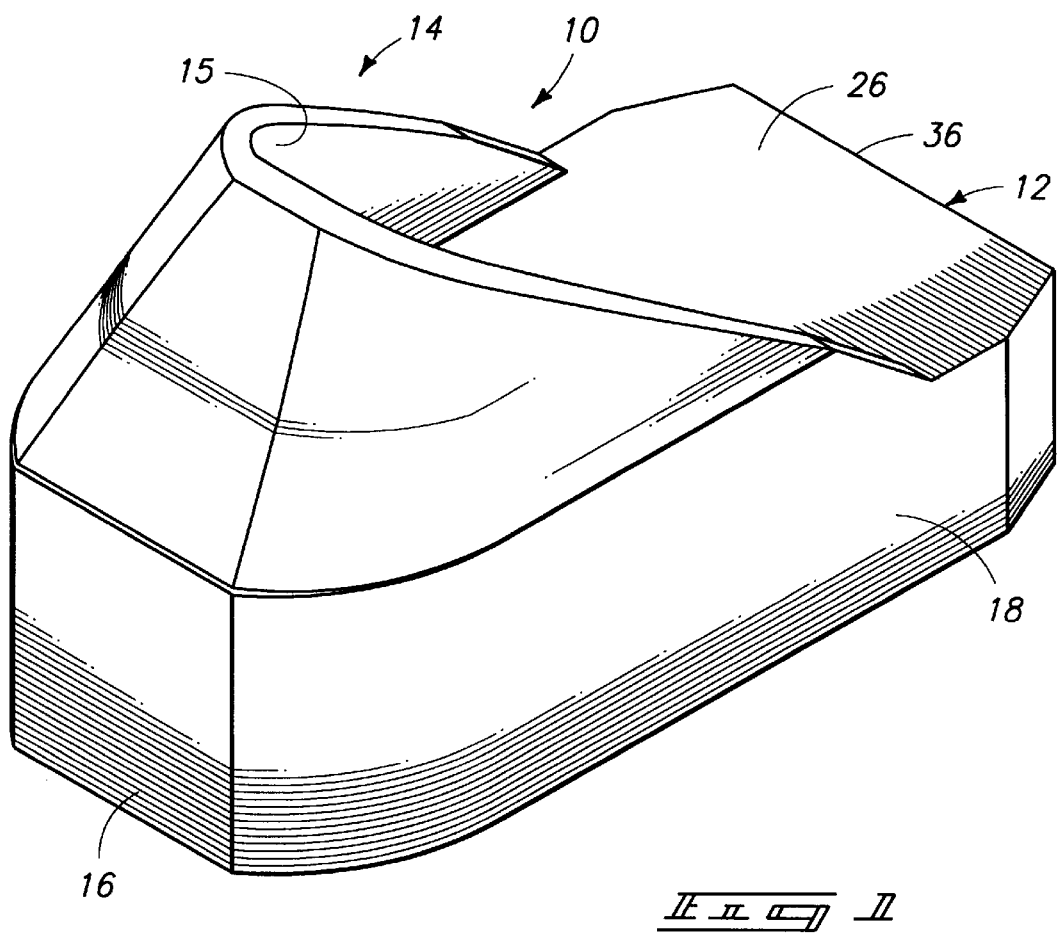

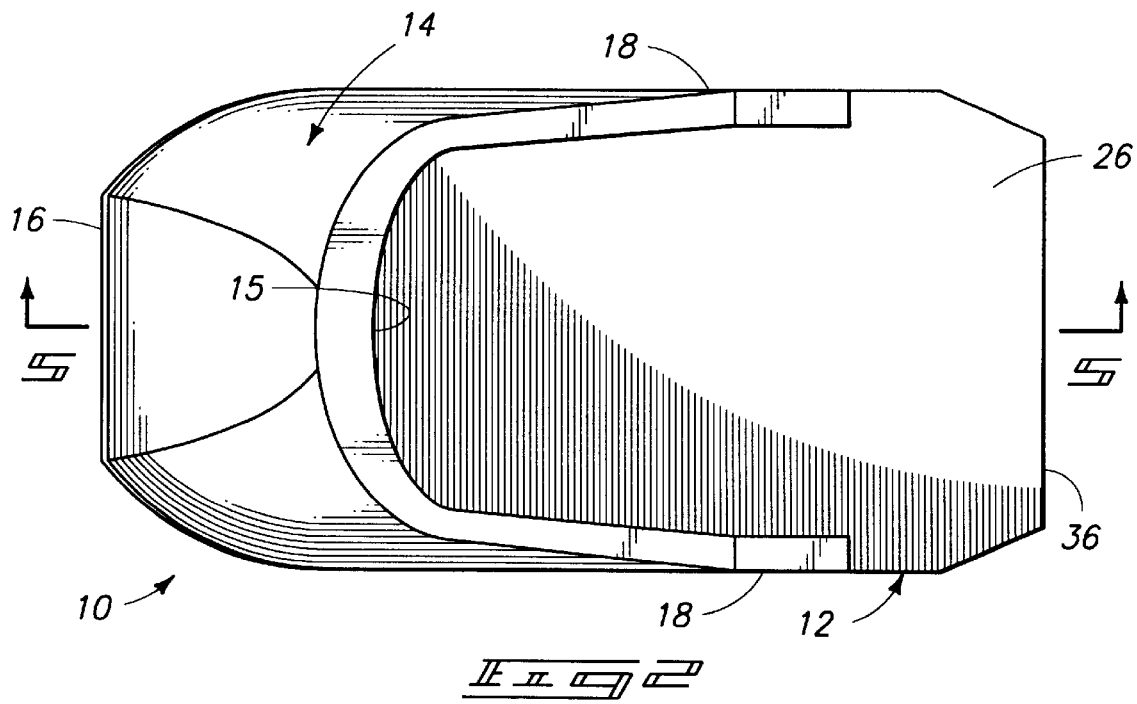
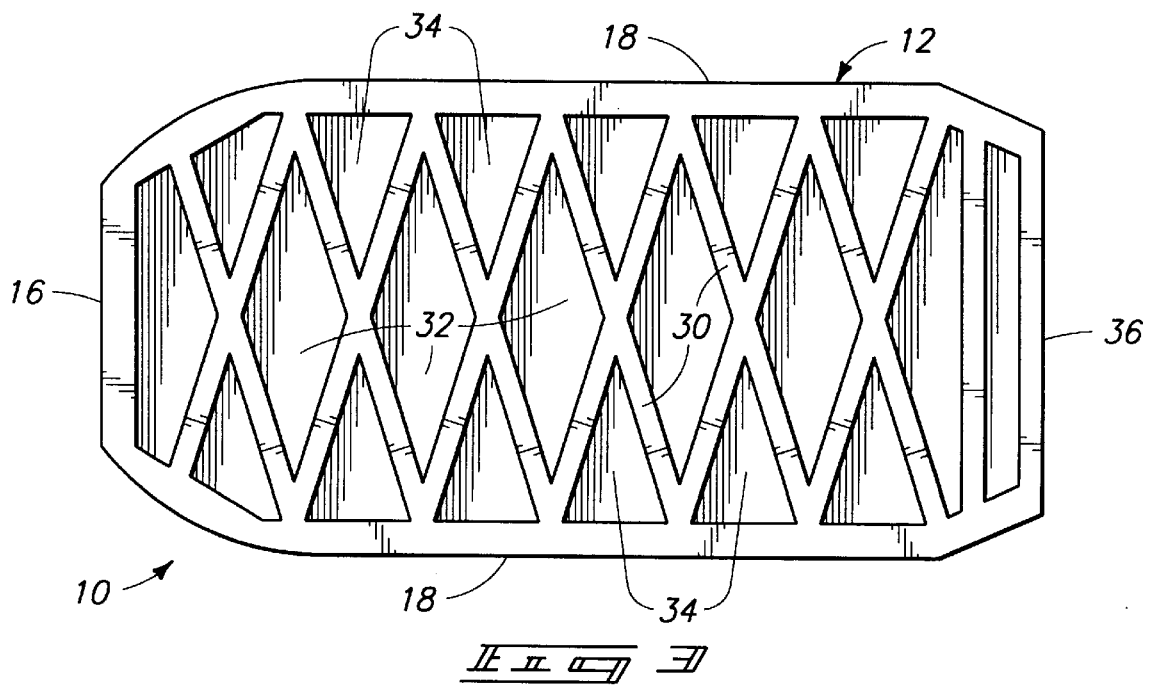

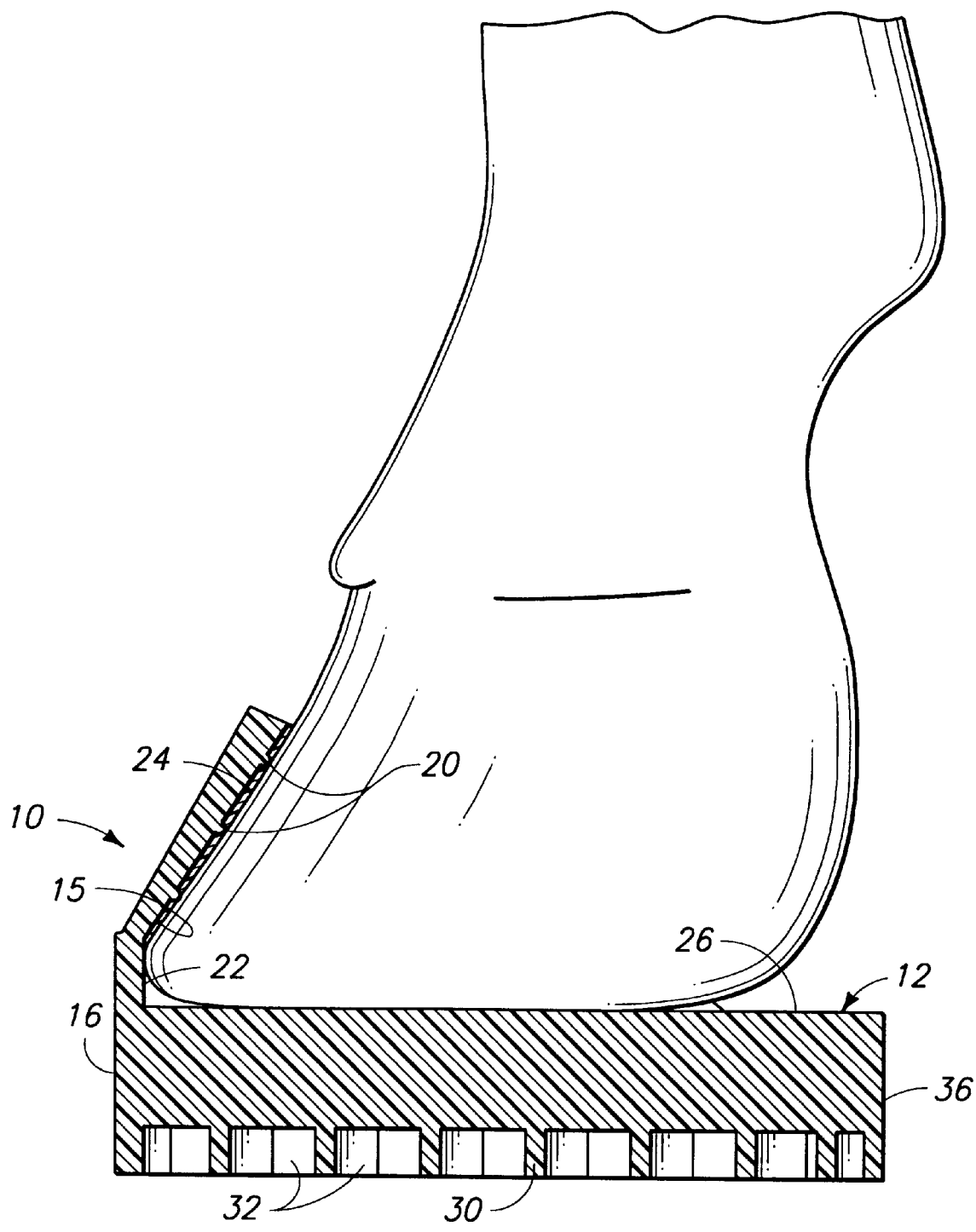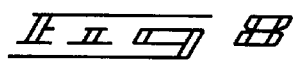

UNIVERSAL CLOVEN HOOF SHOE

TECHNICAL FIELD

The present invention relates to a universal shoes for cloven hoofed animals.

BACKGROUND OF THE INVENTION

Various hoof maladies have been treated in the past by application of medication followed by an attempt to elevate the affected claw of the hoof. This is done so the weight of the animal is not applied to the injured or infected area, but is borne instead by the adjacent healthy claw, and to keep the affected area above the ground surface until healed. Various "shoes and devices" have been designed for this purpose, but have met with only limited success.

Wooden block shoes have been used that are taped, glued, or otherwise secured to the sole of the healthy claw in an attempt to elevate the affected claw above the ground surface. The wood is relatively rigid and can become unstable on wet or hard surfaces. Further if the wooden block shoe is not carefully shaped to accommodate the particular claw, the animal's weight becomes unevenly distributed and injury to the connective ligaments can occur.

Another solution is plastic molded shoes. One shoe mold is shaped for left (or lateral) claws, another mold is shaped for right (or medial) claws. The plastic selected for the shoes is relatively hard. The size, shape and length causes instability on larger claws. Also separate shoes must be purchased for each particular claw (left or right). Still further, the prior plastic shoes have waffle soles that do not effectively distribute the weight of the animal to the outside of the sole where weight should naturally be borne.

The present invention is a solution to the above problems and offers additional objects and advantages not realized by the prior shoe constructions.

BRIEF DESCRIPTION OF THE DRAWINGS

Preferred embodiments of the invention are described below with reference to the following accompanying drawings.

FIG. 1 is a perspective view of a preferred form of the present shoe;

FIG. 2 is a top plan view of the presently preferred shoe;

FIG. 3 is a bottom plan view of the preferred shoe;

FIG. 8 is a sectional view similar to FIG. 5 only showing the shoe mounted to the claw of a cloven hoofed animal.

DETAILED DESCRIPTION OF THE PREFERRED EMBODIMENTS

Figure 4:
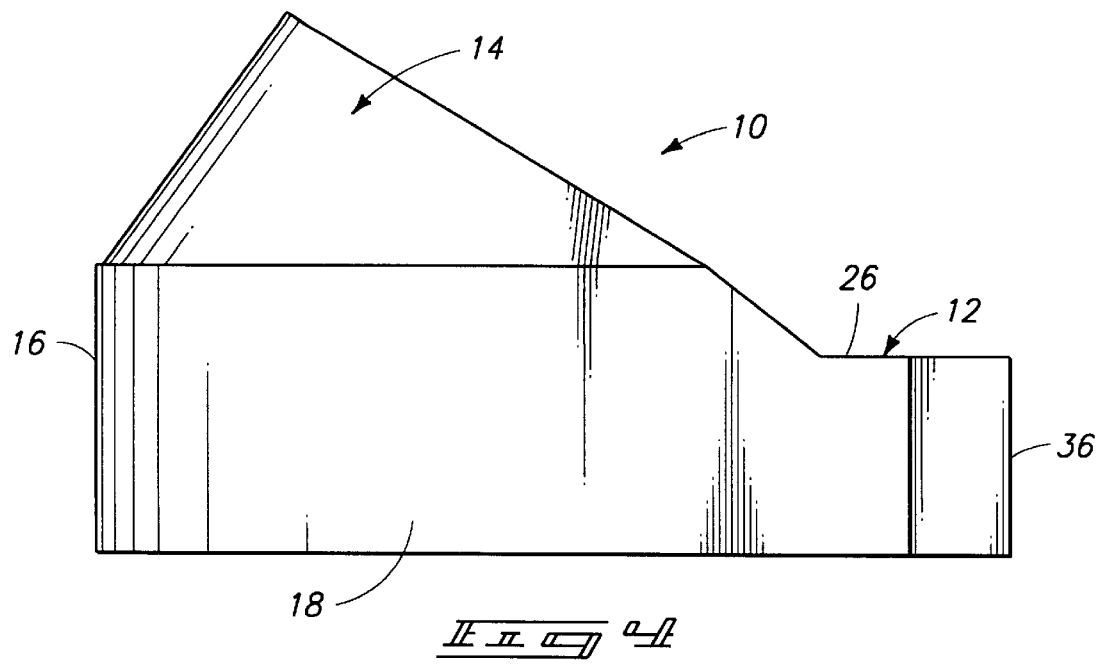
FIG. 4 is a side elevation view.

In a preferred embodiment of the present invention, a universal cloven hoof shoe 10 is shown, formed of a flexible material, preferably a polyvinyl chloride (PVC). The preferred shoe 10 is injection molded but could be formed by another process such as casting. The preferred PVC material is of approximately 80/75 A durometer and specific gravity 1.20.

The presently preferred shoe 10 includes a sole section 12. An upper section 14 is most preferably integral with the sole section 12 and extends upwardly and rearwardly from the toe end 16 and sides 18.

Figure 7:
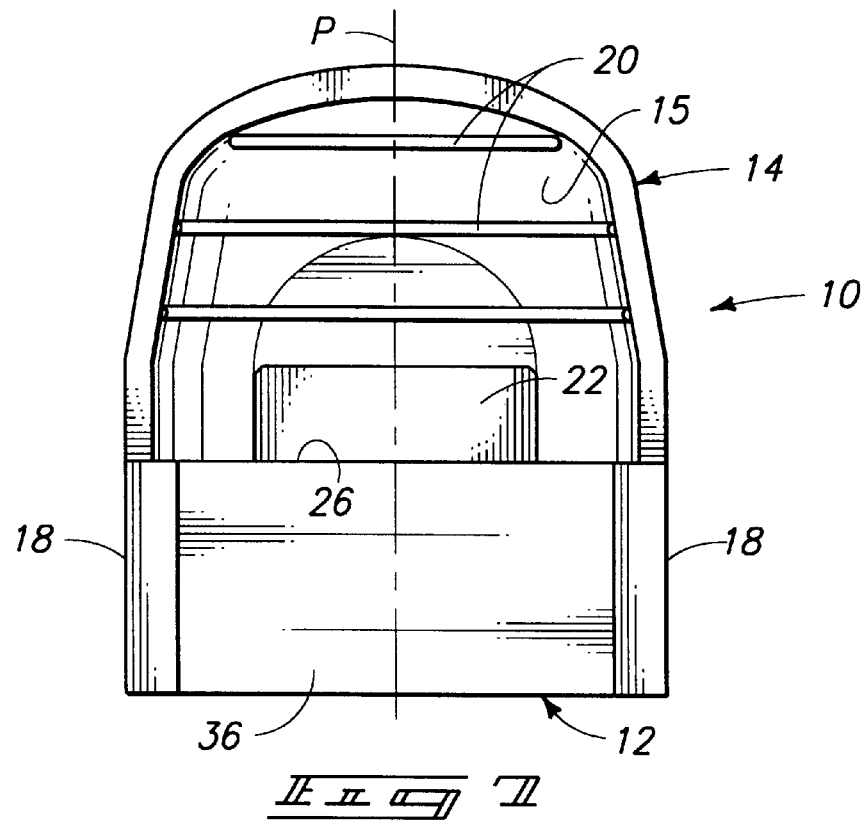
FIG. 7 is a rear end elevation view.

The upper section 14 is shaped with an inward surface 15 forming a claw receiving pocket that is of a universal configuration (preferably symmetrical on opposite sides of a longitudinal central vertical plane P as shown in FIG. 7 bisecting the upper and sole sections) in that it conforms to either the left claw or the right claw of a cloven hoof (either the medial or lateral claw). Thus the same single shoe 10 will fit either claw, and there is no need to supply one shoe configuration for lateral (e.g. left) claws and a different configuration for medial (e.g. right) claws.

The upper section 14 is also angled (with respect to the top surface 26 of the sole) similarly to the angle of the hoof claw, as can be seen in FIG. 8 of the drawings. The angle progressively increases toward the vertical from the center portion (FIG. 5) adjacent the toe end 16 outwardly and rearwardly toward the sides (FIG. 7) where the walls of the upper section become substantially vertical.

The upper section 14 is preferably integral with the sole section 12 and is flexible to conform to the hard surface or "unguis" of the claw. Such flexibility is enabled in part by the above selected flexible material, and in part by the selected thickness of upper section walls, which is preferably approximately 5/32 inches thick along portions of the upper section walls above the sides 18. The thickness of the central part of the upper section starting at the toe end 16 preferably increases progressively from about 5/32 inch at the toe end to a thickness of approximately ¼ inch at the central top edge of the upper section (see FIGS. 2 and 8).

The inward surface 15 of the upper section 14 is preferably provided with a number of elevationally spaced, substantially horizontal ribs 20 that project rearwardly from the upper section inward surface. The upper section also includes a bottom ridge 22 that, along with the ribs 20, functions to abut the unguis and create a space between the unguis and inward surface 15 of the upper section to receive adhesive 24 (FIG. 8).

The bottom ridge or flange 22 is preferably substantially upright (normal to the top surface 26 of the sole section 12) and formed between the inward surface 15 of the upper section and a top surface 26 of the sole section 12. The tip of the claw will abut against the bottom flange 22 (as the shoe is placed on the claw) as the remainder of the claw comes into contact with the ribs 20 along the inward surface of the upper section 14. Similarly, the ribs 20 will abut the adjacent surface of the unguis before contact is made with the remainder of the upper section 14.

Thus a glue space is created between the unguis and the inward surface 15 to permit adhesive placed within the shoe along the inward surface and bottom ridge to conform intimately to both facing surfaces of the unguis and upper section 14. The ribs 20 confine the adhesive to the desired area of the unguis, as shown in FIG. 8, to avoid excessive seeping of uncured adhesive onto the top surface 26 of the sole section. Adhesive on the sole of the shoe is undesirable since the hardness on the sole would be undesirably affected by the adhesive when cured. The ribs 20 also aid to avoid undesirable spillage of adhesive over the top edges of the upper section 14 and onto the top surface of the coronet corium areas of the animal's hoof.

The sole section 12 includes a thickness dimension intended to elevate the engaged claw and the adjacent affected claw above the ground surface. To this end, a thickness dimension between the top and bottom surfaces of between approximately 0.75 and 1.5 inches and most preferably approximately 1.125 inches is especially desirable for bovine applications. Such additional height assures that the affected adjacent claw will be elevated above the ground surface, even when the animal is walking on soft ground.

Figure 5:
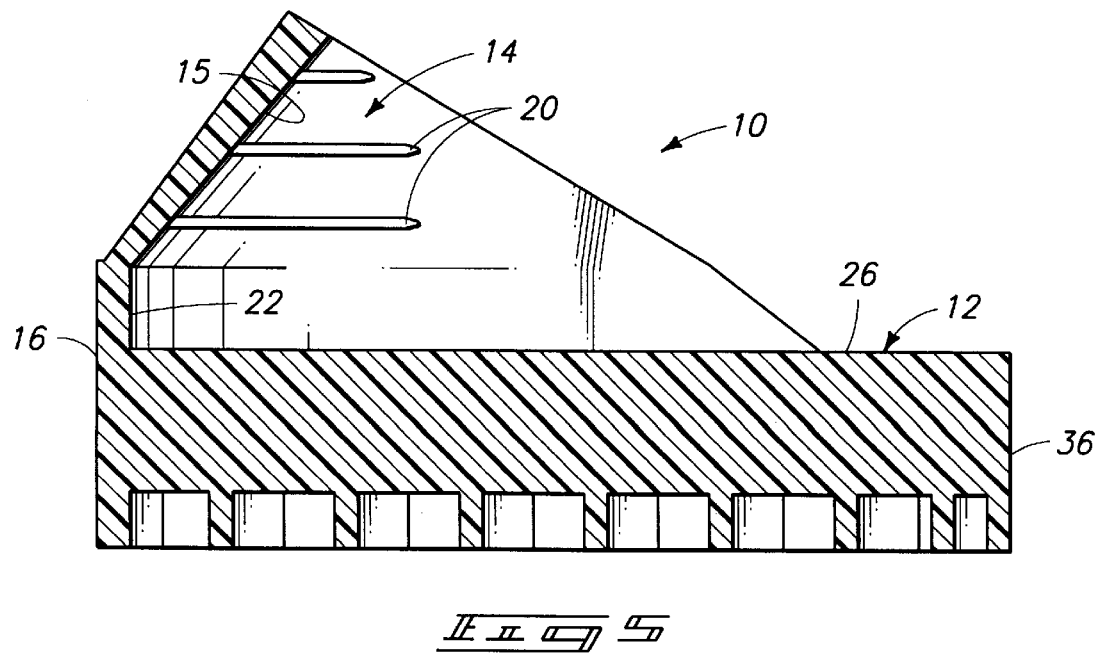
FIG. 5 is a longitudinal sectional view of the preferred shoe.
Figure 6:
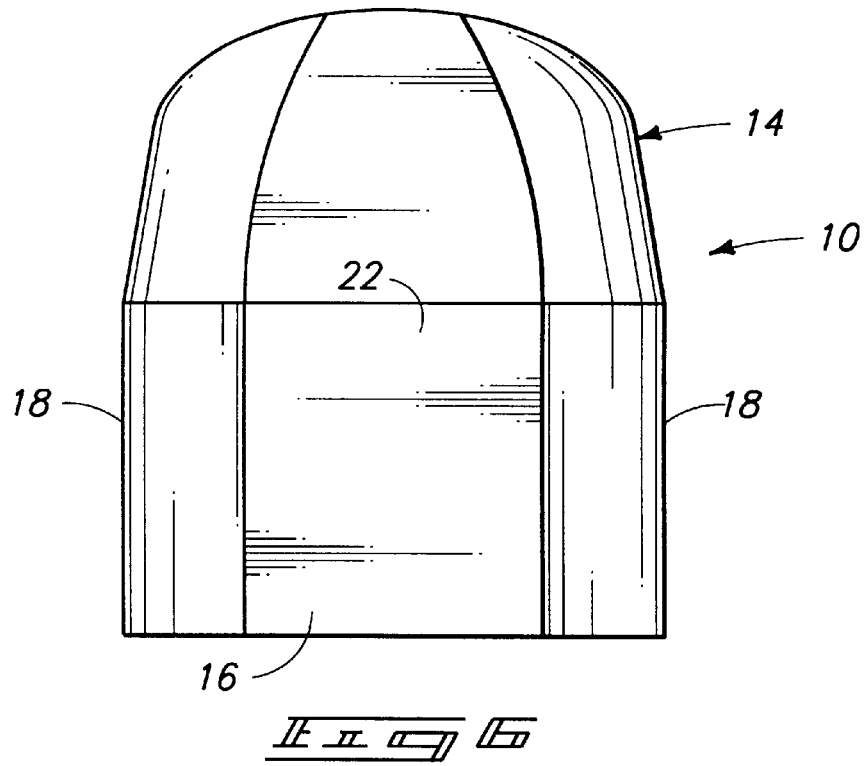
FIG. 6 is a front end elevation view.

The sole is formed with a preferred diamond-shaped tread pattern 30 on its bottom side as shown in FIGS. 3, 5 and 8. The open tread pattern minimizes the amount of material used to produce the shoe, thereby reducing cost. Also the open pattern shown does not accumulate dirt and debris, especially in the central area of the sole where maximum flexibility is desired.

The cross members 30 of the tread pattern define a lattice that is more open along the longitudinal center, forming large open diamond shaped recesses 32 along the center of the sole, and smaller triangular recesses 34 along the sole sides (FIG. 3). This is done to situate more of the sole material below the sides of the claw, providing more rigidity along the sides than the central areas. With more material along the sides, more wearing and bearing surface is situated along the sides 18 where the weight of the animal should be carried naturally, along the sides of the claw rather than the softer inward surfaces.

The tread pattern is also provided to be open substantially as shown in FIG. 3 adjacent the toe end 16 of the shoe, so the shoe will wear faster along the toe area. The toe area will become rounded with wear, taking a natural shape unique to the particular animal wearing the shoe. Conversely, the heel end 36 is provided with a more massive, tighter pattern to minimize wear yet maintain flexibility at the heel end 36 of the shoe.

The preferred shoe is also of sufficient length to extend somewhat beyond the heel of the engaged claw (FIG. 8). This is done to provide maximum support at the heel end of the animal's hoof. In particular, the heel end 36 of sole 12 (including the upper surface 26, sides 18, and bottom tread pattern 30) is extended rearwardly beyond the rearmost junction of upper section 14 to surface 26 (see FIGS. 1, 2, 4, 5 and 8).

The present shoe is applied simply by applying an adhesive (such as a mixture of methyl methacrylate powder and monomer liquid) to the inward surface of the upper section 13, between the top and bottom ridges 20, 22. The shoe is then slipped over the desired claw (medial or lateral), to bring the ribs 20 and bottom ridges 22 into engagement with the toe end of the claw and the unguis, and the sole surface of the claw in contact with the top surface of the sole section. The adhesive will spread and conform intimately to the unguis and inward surface of the upper section 14, and will not spill over in excessive amounts onto the top surface of the coronet corium section. The shoe is now installed and the adhesive is allowed to cure, adhering the shoe to the engaged claw.

The thick sole will function to elevate the engaged claw and the adjacent affected claw above the ground surface and permit the animal to walk normally as the healing process continues.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A shoe for a claw of a cloven hoof, comprising:
   a sole section including a top surface, an opposed bottom edge, a toe end, an opposed heel end, and sides joining the top surface and bottom edge and extending rearwardly from the toe end;
   an upper section formed integrally with the sole section and extending upwardly from the sides and rearwardly from the toe end, said upper section having a universal shape that is symmetrical on opposite sides of a longitudinal central vertical plane extending from toe to heel, said upper section being capable of receiving one of either a left claw or a right claw of a cloven hoof, said upper section being angled with respect to the top surface of the sole section to conform to an angle of a hoof claw; and
   a tread pattern formed along the bottom edge.

2. A cloven hoof shoe as claimed by claim 1, wherein a heel supporting extension is provided on said sole section projecting horizontally and rearwardly beyond said upper section for supporting the weight of the heel of said claw.

3. A cloven hoof shoe as claimed by claim 2, wherein the sole section and upper section are formed from a flexible material, and said top surface and said bottom edge are spaced apart by a thickness dimension equal to approximately 1.125 inches.

4. A cloven hoof shoe as claimed by claim 3, wherein the sole section and upper section are formed of molded polyvinyl chloride having a hardness of approximately 80/75 A durometer and specific gravity at approximately 1.20.

5. A cloven hoof shoe as claimed by claim 2, wherein the tread pattern is formed by a series of openings formed across the bottom edge of the sole section between the sides and extending substantially from the toe end rearwardly.

6. A cloven hoof shoe as claimed by claim 2, wherein the tread pattern is a lattice made up of a series of cross members formed across the bottom edge of the sole section between the sides, said cross members having openings therebetween wherein the openings include open diamond shaped recesses along a center portion of the bottom edge of the sole between the sides, and smaller triangular recesses nearer the sides of the bottom edge, such that more material of the cross members is present to provide support nearer the sides than the center of the bottom edge.

7. A cloven hoof shoe as claimed by claim 6, wherein the tread pattern is substantially more open near the toe end of the shoe and substantially more closed near the heel end of the shoe.

8. A cloven hoof shoe as claimed by claim 7, wherein the upper section includes an inward surface, an integral bottom flange that is substantially upright and formed between the inward surface of the upper section and the top surface of the sole section.

9. A cloven hoof shoe as claimed by claim 7, wherein the upper section includes an inward surface, and a number of elevationally spaced, substantially horizontal ribs that project rearwardly from the inward surface forming glue receiving recesses along the inward surface.

10. A cloven hoof shoe as claimed by claim 2, wherein:
    the upper section includes an inward surface;
    an integral bottom ridge that is substantially upright is formed between the inward surface of the upper section and the top surface of the sole section; and
    a number of elevationally spaced, substantially horizontal ribs are provided that project rearwardly from the upper section inward surface forming glue receiving recesses along the inward surface.

11. A universal shoe for a claw of a cloven hoof, comprising:

a sole including a top surface, an opposed bottom edge, a toe end, an opposed heel end, and sides joining the top surface and bottom edge;

an upper section formed integrally with said sole and extending upwardly from the sides and rearwardly from the toe end, said upper section having a universal shape that is symetrical on opposite sides of a longitudinal central vertical plane extending from toe to heel wherein said upper section is capable of receiving one of either a left claw or a right claw of a cloven hoof, said upper section being angled with respect to the top surface of the sole to conform to an angle of a hoof claw, said upper section including an inward surface, and an integral bottom flange that is substantially upright and formed between the inward surface of the upper section and the top surface of the sole, and a number of elevationally spaced, substantially horizontal ribs that project rearwardly from the inward surface forming glue receiving recesses along the inward surface;

a heel supporting extension on said sole projecting horizontally and rearwardly beyond said upper section for supporting the weight of the heel of said claw; and a tread pattern formed along said bottom edge made up of a series of cross members formed across the bottom edge of the sole between the sides, said cross members having openings therebetween wherein the openings include open diamond shaped recesses along a center portion of the bottom edge of the sole between the sides, and smaller triangular recesses nearer the sides of the bottom edge, such that more material of the cross members is present to provide support nearer the sides than the center of the bottom edge, said tread pattern being substantially more open near the toe end of the shoe and substantially more closed near the heel end of the shoe.

* * * * *